US008065655B1

(12) United States Patent
Deo et al.

(10) Patent No.: US 8,065,655 B1
(45) Date of Patent: Nov. 22, 2011

(54) SYSTEM AND METHOD FOR THE AUTOGENERATION OF ONTOLOGIES

(75) Inventors: Shardul Deo, Austin, TX (US); Aaron Dixon, Austin, TX (US); Matthew Sanchez, Round Rock, TX (US); Steven Teleki, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1555 days.

(21) Appl. No.: 11/455,946

(22) Filed: Jun. 20, 2006

(51) Int. Cl.
 *G06F 9/44* (2006.01)
(52) U.S. Cl. ......... 717/106; 717/104; 717/114; 717/137
(58) Field of Classification Search .................. None
See application file for complete search history.

(56) References Cited

U.S. PATENT DOCUMENTS

| | | | | |
|---|---|---|---|---|
| 6,539,396 B1* | 3/2003 | Bowman-Amuah | .......... | 707/769 |
| 6,721,807 B2* | 4/2004 | Vlissides | ...................... | 719/315 |
| 6,851,105 B1* | 2/2005 | Coad et al. | .................... | 717/106 |
| 7,076,766 B2* | 7/2006 | Wirts et al. | ................... | 717/121 |
| 7,424,701 B2* | 9/2008 | Kendall et al. | ................ | 717/105 |
| 2002/0099866 A1* | 7/2002 | Vlissides | ...................... | 709/315 |
| 2003/0149934 A1* | 8/2003 | Worden | ........................ | 715/513 |
| 2003/0226111 A1* | 12/2003 | Wirts et al. | ................... | 715/514 |
| 2004/0093344 A1* | 5/2004 | Berger et al. | ................ | 707/102 |
| 2004/0163041 A1* | 8/2004 | Engel | ............................ | 715/509 |
| 2007/0112718 A1* | 5/2007 | Liu et al. | ........................ | 706/47 |
| 2007/0180424 A1* | 8/2007 | Kazakov et al. | .............. | 717/104 |
| 2007/0288885 A1* | 12/2007 | Brunel et al. | ................. | 717/104 |
| 2008/0312898 A1* | 12/2008 | Cleary et al. | .................... | 703/21 |

OTHER PUBLICATIONS

Gašević et al., Converting UML to OWL Ontologies, published by ACM 2004, pp. 488-489.*
Gašević et al., From UML to Ready-To-Use OWL Ontologies, published at Second IEEE International Conference on Intelligent Systems, Jun. 2004, pp. 485-490.*
Gašević et al., A UML Profile for OWL Ontologies, published by Springer 2005, pp. 204-219.*
Gronmo et al., Transformations between UML and OWL-S, published by Springer Nov. 2005, pp. 1-15.*
Jean I/O Mini HowTo, retrieved online [http://web.archive.org/web/20050415043332/jena.sourceforge.net/IO/iohowto.html], published before 2005, pp. 1-11.*
DEV396 Essentials of Rational Software Architect, 2005.01.00 Student Guide Part No. 800-027144-000, publised b IBM 2005, pp. 1-28.*

* cited by examiner

*Primary Examiner* — Tuan Dam
*Assistant Examiner* — Zheng Wei
(74) *Attorney, Agent, or Firm* — Stevens & Showalter LLP

(57) ABSTRACT

A utility transforms a class diagram representing an ontology, such as a UML class diagram, into a fully-described, standard representation of an ontology such as OWL file. It may be based on Rational Software Architect (RSA) and its model transformation capabilities. The RSA transformation framework uses a Visitor-like pattern for iterating over all of the UML elements in a UML diagram. The framework allows the developer to configure 'Rule' classes that are executed when different types of UML elements are encountered. Each UML element is visited once, which causes each rule to be fired for each element type. Rules are configured for just those UML types that are of interest to the transformation, for example classes, primitives, properties, packages and instances. Each rule in the implementation is then written to delegate to a Registrar class, which has a method for building the ontology model from the registered UML elements.

20 Claims, 10 Drawing Sheets

Obtaining an AG tool 300.
2000

Creating an AG tool 300.
2100

Receiving an AG tool 300.
2200

Fig 6

SYSTEM AND METHOD FOR THE AUTOGENERATION OF ONTOLOGIES

FIELD OF THE INVENTION

The present invention relates generally to the field of software tools for machine-readable representing ontologies.

BACKGROUND OF THE INVENTION

Ontologies

Business enterprises often need to create ontologies, in order for people, databases, and applications to share information within a certain domain. In these cases, an ontology is represented as a machine-readable set of terms that describe details of the domain. Having an ontology in a machine-readable format allows an enterprise to make full use of ontology methodologies and tools.

Example of an Ontology

A simple but useful ontology might describe a domain consisting of an organization's employees, employee teams, and departments. Relationships between employees and teams, employees and departments, and the set of properties that characterize employees, teams, and departments can be fully described by an ontology. This ontology could be represented in an electronic, machine-readable format—for example, in the NTriple format or one of the OWL (Web Ontology Language) dialects.

Advantages of Using an Ontology

The benefits of an organization or enterprise using such an ontology include:

Having a better conceptual and intellectual relationship to the data described in the domain;

Using established ontology tools for reading, writing, and inferring more data described in the domain;

Ease of sharing and integrating data with other parties using the same or similar domain;

Developing software applications that use and write data within the domain; and

Being able to easily modify/extend the domain description by updating the ontology.

Many of the valuable usages of ontologies require the ontology to be represented as ontology description artifacts in a standard, machine-readable ontology format, such as NTriple or one of the OWL dialects.

Prior Techniques for Creating Ontologies

Until now, ontology description artifacts have been produced in a number of ways:

Programmatically using an ontology API;

Using a GUI ontology editor; or

By hand-writing text files using XML (Extended Markup Language), in the case of producing OWL, for example, or some other description language.

Programmatically Using an Ontology API

For programmatically using an ontology API, such as Jena, software has to be written, which is costly and requires programming expertise as well as expertise in the API being employed.

Using a GUI Ontology Editor

Software tools such as Protégé or Altova have been created to partially facilitate the process of generating ontologies. For example, Protégé is a well-known GUI ontology editor, and Jena is a Java based framework that facilitates processing and constructing ontologies programmatically. This method requires familiarity with the specific editor to be used.

Hand-Writing Text Files Using XML

Programmers have used simple XML codes and other description languages to create machine-readable ontologies. This is the most cumbersome prior technique of those mentioned: it requires intimate familiarity with the description language being used and is prone to typos and other mistakes.

In summary, these prior techniques are typically complicated to use and require experts that are familiar with ontologies and related concepts to perform them, making them time consuming and therefore expensive. They require a significant degree of familiarity with ontology description languages such as OWL, which makes it hard for domain experts and business analysts to contribute to ontology data without first becoming versed in new, relatively complex standards.

Therefore there is a need for a faster and more user-friendly way to go about producing such ontology descriptions without having to use special experts.

BRIEF SUMMARY OF THE INVENTION

These and other needs are addressed by the present invention. The following explanation describes the present invention by way of example and not by way of limitation.

It is an aspect of the present invention to provide a fast and user-friendly way to go about producing machine-readable ontology descriptions without having to use special experts.

This and other aspects, features, and advantages are achieved according to the method and apparatus of the present invention. In accordance with the present invention, an autogeneration (AG) utility is provided that transforms a class diagram representing an ontology, such as a UML (Unified Modeling Language) class diagram, into a fully-described, standard representation of an ontology such as OWL file. It may be based on Rational Software Architect (RSA) and its model transformation capabilities. The RSA transformation framework uses a Visitor-like pattern for iterating over all of the UML elements in a UML diagram. The framework allows the developer to configure 'Rule' classes that are executed when different types of UML elements are encountered. Each UML element is visited once, which causes each rule to be fired for each element type. Rules are configured for just those UML types that are of interest to the transformation, for example classes, primitives, properties, packages and instances.

Each rule in the implementation is then written to delegate to a Registrar class, which has a method for building the ontology model from the registered UML elements.

BRIEF DESCRIPTION OF THE DRAWINGS

The following embodiment of the present invention is described by way of example only, with reference to the accompanying drawings, in which:

FIG. 6 is top-level flow chart that illustrates methods for obtaining an AG tool;

DETAILED DESCRIPTION

The details of the following description are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Operating Environment

Figure 1:
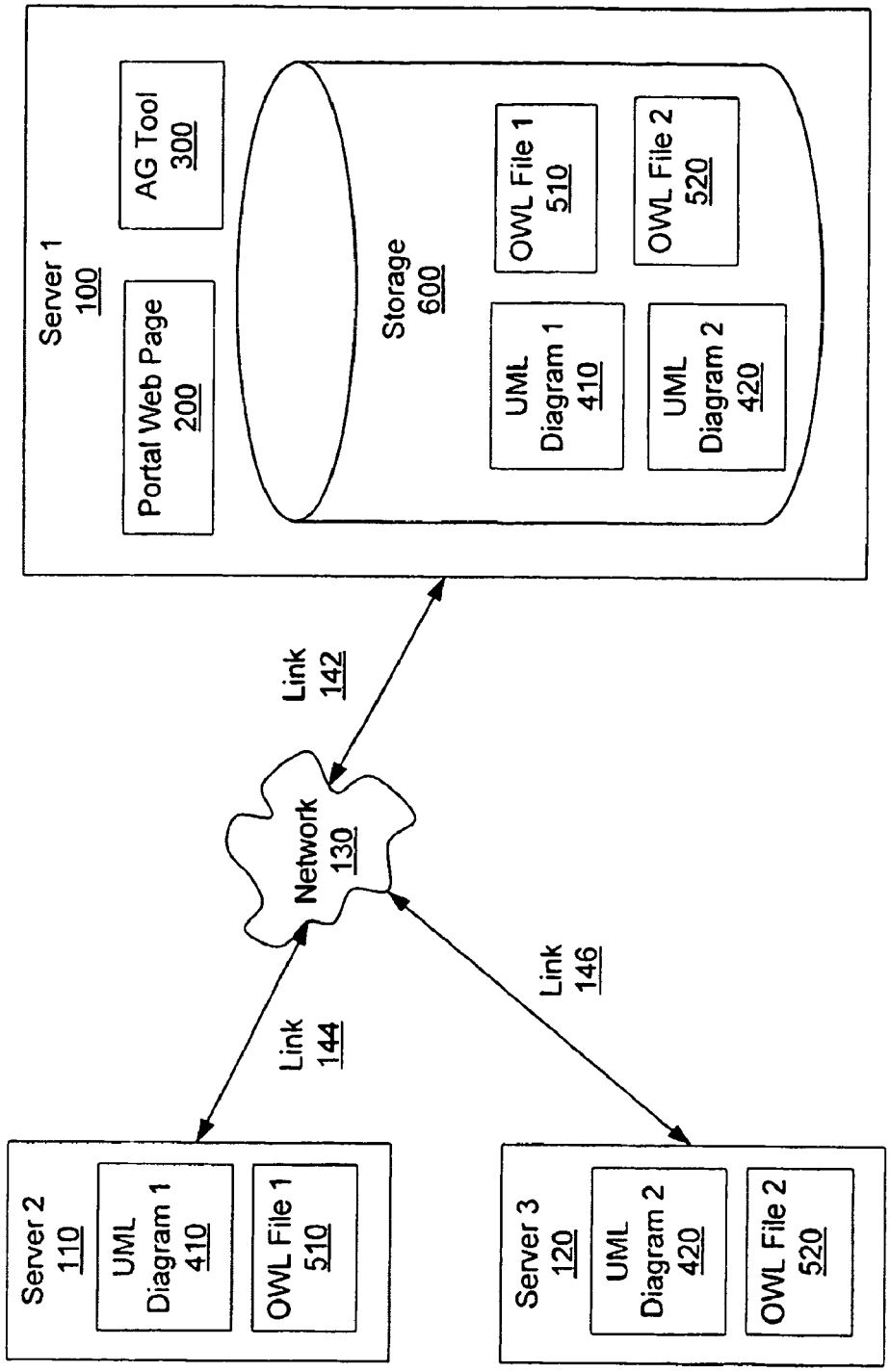
FIG. 1 is a block diagram showing an operating environment in which embodiments of the present invention may be employed.

An embodiment of an operating environment of the present invention is shown in FIG. 1. A party at server 1 100 creates an AG (autogeneration) tool 300, which is a software transformation utility that transforms a UML (Unified Modeling Language) class diagram, such as UML diagram 1 410, representing an ontology, into a fully-described, standard representation of an ontology such as OWL file 1 510.

Server 1 100 can communicate with other servers, such as server 2 110 and server 3 120, through a wired or wireless network 130 and wired or wireless links 142, 144, and 146. The servers 100, 110, and 120 may be personal computers, larger computerized systems; or other computerized devices. The network 130 may be the Internet, a private LAN (Local Area Network), a wireless network, a TCP/IP (Transmission Control Protocol/Internet Protocol) network, or other communications system, and may comprise multiple elements such as gateways, routers, and switches. The links 142, 144, and 144 are compatible with the technology used for network 130.

Server 2 110 can provide a class diagram, such as UML diagram 1 410, that represents a useful ontology, and can transmit UML diagram 1 410 to server 1 100. In the same way, server 3 120 can provide UML diagram 2 420, representing another useful ontology, and can transmit UML diagram 2 420 to server 1 100.

On server 1 100, a party further sets up storage 600, which is an electronic storage area that can store files, such as UML diagram 1 410 and UML diagram 2 420. In an embodiment, a party can also set up a portal Web page 200 to coordinate communications with other servers such as server 2 110 and server 3 120. Thus a party at another server, such as server 2 110, can contact server 1 100 through portal Web page 200 and send a UML class diagram 1 410 for automatic transformation into an OWL file 1 510 at server 1 100 by means of AG tool 300. The OWL file 1 510 can then be sent automatically back to server 2 110 for ontology use there.

In another embodiment, communications between server 1 100 and server 2 110 can be machine to machine, without use of a portal Web page 200.

In other embodiments, the elements given above may be more widely dispersed on different servers or used independently of server 1 100. In the embodiment shown in FIG. 2, for example, the AG tool 300 could be created on server 1 100 and sent to server 2 110 for use there. In this way, UML class diagram 1 410 could be transformed into OWL file 1 510 at server 2 110.

Figure 3:
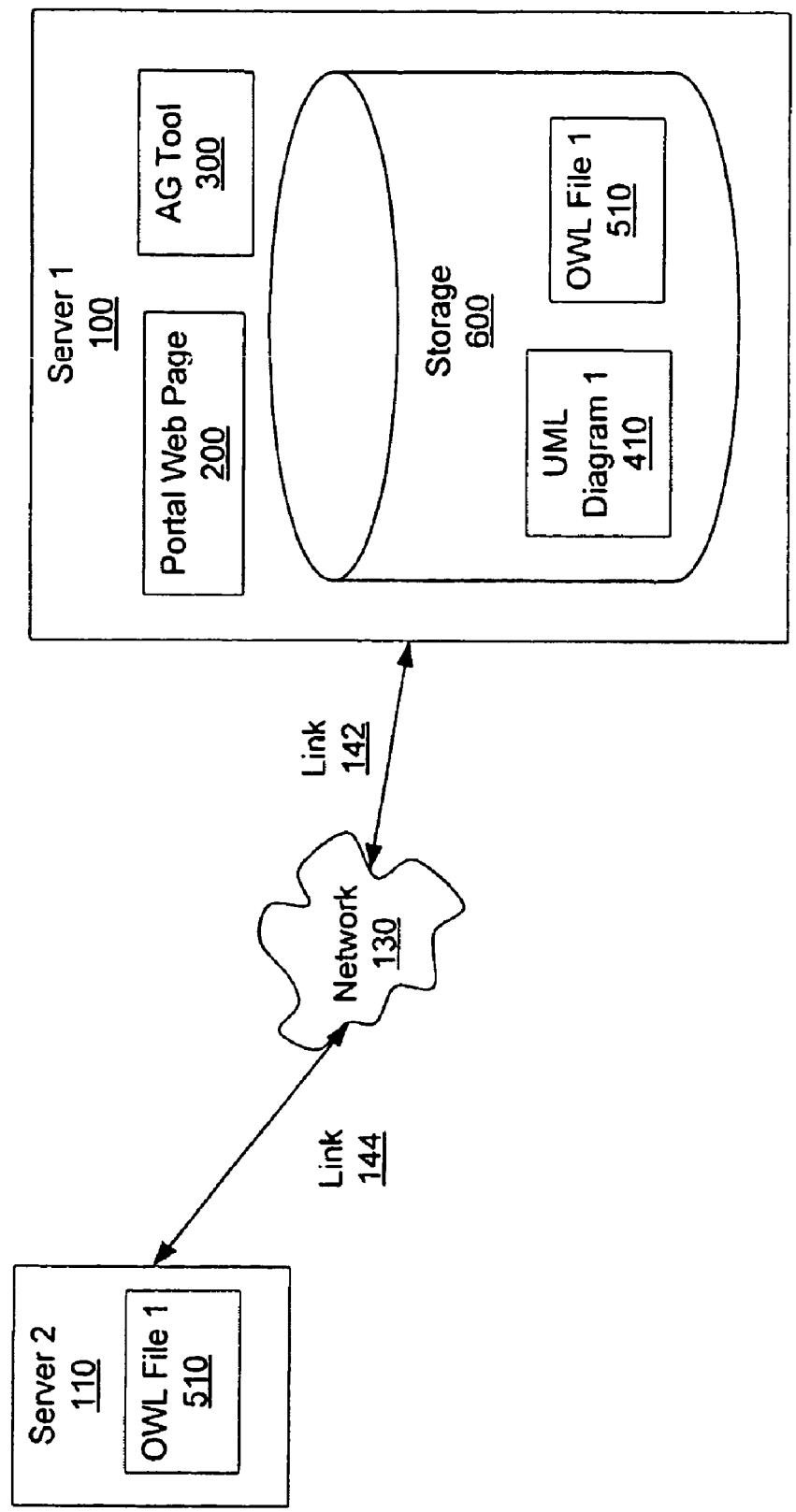
FIG. 3 is a block diagram showing an operating environment in which a UML class diagram can be created on one server, transformed there into an OWL file by means of an. AG tool, and then sent to another server.

In the embodiment shown in FIG. 3, UML class diagram 1 410 could be created on server 1 100, transformed there into OWL file 1 510 by means of AG tool 300, and then sent to server 2 110.

Figure 4:
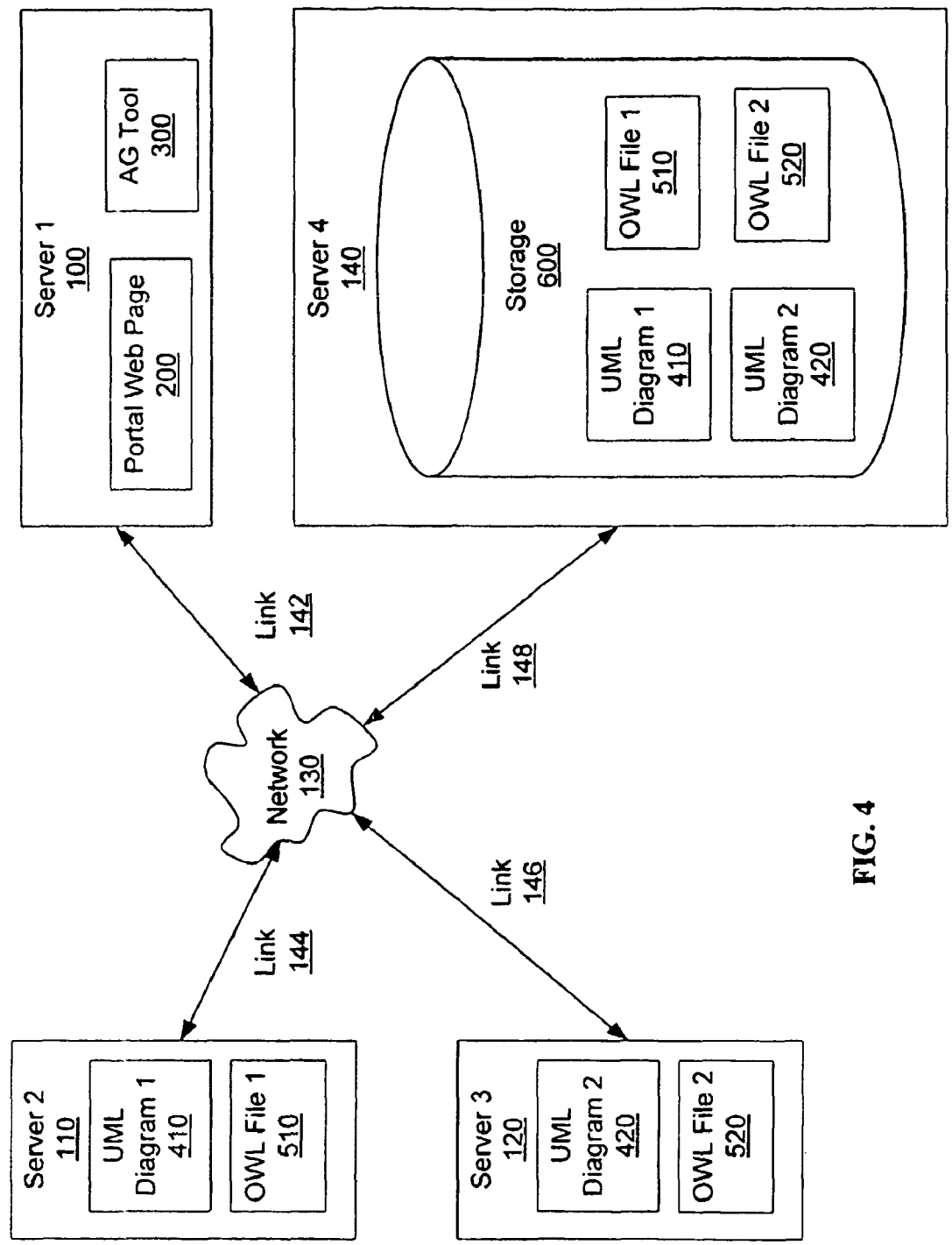
FIG. 4 is a block diagram showing an operating environment in which an AG tool can be used on one server and storage can be used on another server.

In another embodiment shown in FIG. 4, storage 600 could be set up on a different server from server 1 100, such as on server 4 140, that can communicate with network 130 over link 148.

Process

Figure 5:
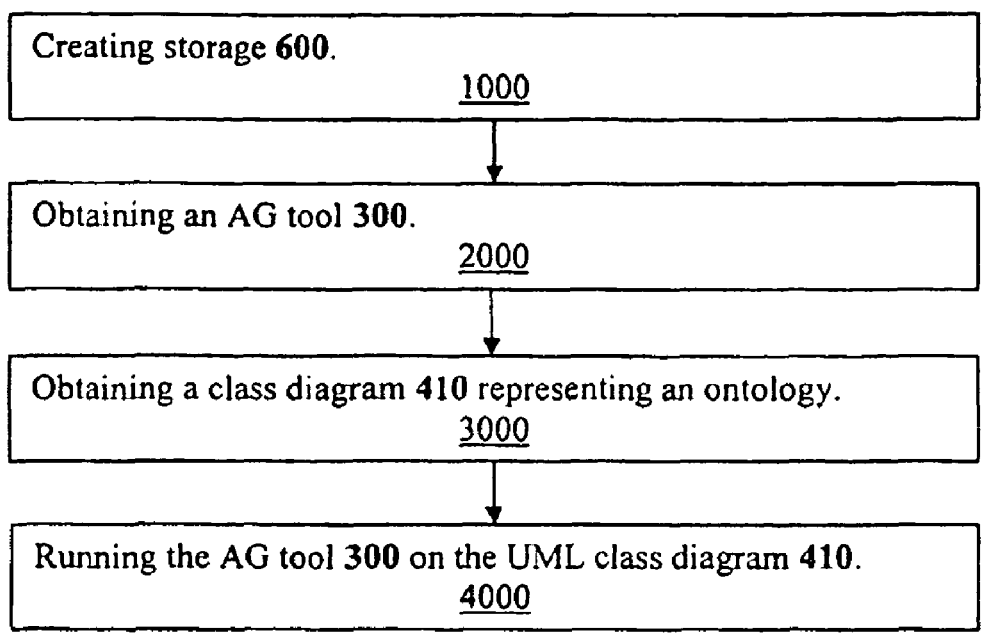
FIG. 5 is top-level flow chart that illustrates a process for transforming a UML class diagram into an OWL file.

FIG. 5 is top-level flow chart that illustrates a process for transforming a UML class diagram into an OWL file through the operating environment shown in FIG. 1.

Step 1000 in FIG. 5. Creating storage 600.

On server 1 100, shown in FIG. 1, one or more programmers create a non-volatile data storage area 600 capable of storing electronic files.

Step 2000 in FIG. 5. Obtaining an AG tool 300.

An AG tool 300 may be obtained in two ways, shown in FIG. 6.

In an embodiment represented by Step 2100 in FIG. 6, one or more programmers at server 1 100, shown in FIG. 1, create an AG tool 300.

Step 2100 in FIG. 6.

In an embodiment, an AG tool 300 can be based on the IBM® Rational® Software Architect (RSA) and its model transformation capabilities.

The RSA transformation framework uses a Visitor-like pattern for iterating over all of the UML elements in a UML diagram. The framework allows the developer to configure 'Rule' classes that are executed when different types of UML elements are encountered. Each UML element is visited once, which causes each rule to be fired for each element type. Rules are configured for just those UML types that are of interest to the transformation.

For transformation implementation, rules are registered for these UML types: classes, primitives, properties, packages and instances. Each rule in the implementation is then written to delegate to a Registrar class, UmlToOntRegistrar, that handles processing for each element:

```
class UmlToOntRegistrar {
    void registerClass(UMLClass c);
    void registerPrimitive(UMLPrimitive p);
    void registerProperty(UMLProperty p);
    void registerPackage(UMLPackage p);
    void registerinstance(UMLInstance i);
    IntermediateModel buildIntermediateModel( )
```

Figure 7:
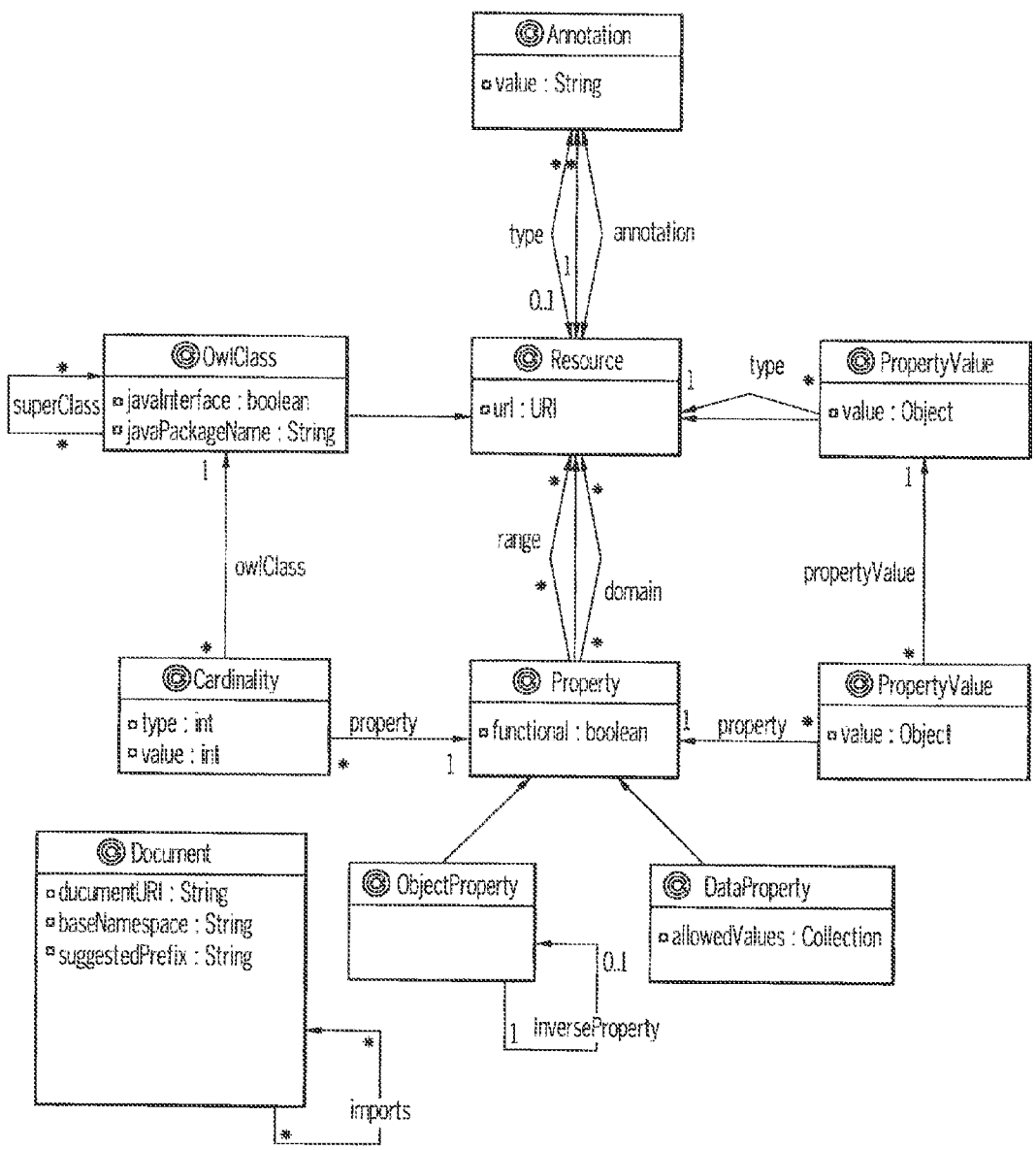
FIG. 7 is a block diagram illustrating an example of an implementation of the intermediate model for an AG tool.

The Registrar class has a method, buildIntermediateModel( ) for building the Ontology model from the registered UML elements. The idea is that the RSA framework registers each and every UML element in the UML model and then buildIntermediateModel( ) is called to compute an in-memory representation of the transformed ontology. The main transformation 'work', then, is performed by accumulating the in-memory ontology model as the UML elements are registered one at a time. FIG. 7 shows an example of an implementation of the intermediate model.

To produce the ontology in a standard, machine-readable form, various writers are implemented that traverse the in-memory model and write the ontology to file in a concrete ontology language. For example, a class, OwlWriter, is used that has a method writeOwlFromInternalModel(IntermediateModel m) that performs just this step in the case of OWL output. This method can be implemented by using the open source Jena API.

The significant work in performing the transformation is done in the UmlToOntRegistrar class. The following code is a pseudo code description of that class, with comments:

```
class UmlToOntRegistrar {
    /**
    Register a UML class.
    */
    void registerClass(UMLClass c){
        if (is StereotypedAsProperty(c)){
            //The UML class is annotated as a property, so it is
                necessary to
            //read its annotations to convert it to a property and
            //and register it as one would a property.
            registerProperty(convertToProperty(c));
        }
        else{
            //Because the class is annotated via stereotype
                attributes
            //it is necessary to read those properties and store
                them in-memory
            //With the class. An example of such an attribute is
                a UML
            //multiplicity value for a class property.
            metadata :=readRelevantStereotypeAttributes(c);
            //The internalForm( )method here is used to convert
                UML into
            //the intermediate form. It essentially copies the
                relevant
            //properties from the UML element to the internal
                instance.
            //It also traverses a local part of the UML graph to
                discover
            //information about package containment, for
                example, to copy
            //into the target internal form representation. This
                method
            //and similar methods also perform some linking of
                existing
            //registered objects, according to the relationships
                expressed
            //by the intermediate model.
            addToCollectionOfRegisteredClasses(internal-
                Form(c), metadata);
        }
    }
    /**
    *Register a UML Primitive.
    */
    void registerPrimitive(UMLPrimitive p){
        //Register the primitive in a collection of primitives.
        addToCollectionOfRegisteredPrimitives(internalForm
            (p));
    }
    /**
    *Register a UML Property.
    */
    void registerProperty(UMLProperty p){
        //Because properties can appear on multiple classes, the
            property, identified
        //by name, may have already been registered. In which
            case, one should use the
        //registered version and contribute any new metadata
            about it.
        registered :=registerOrGetExisting(p);
        if (is DefinedOnSpecificClass(p)) {
            c :=registerOrGetExistingClassFor(p);
            //Here, one has a property that is defined on a particu-
                lar class. In this
            //case the property may have some specific restric-
                tions, such as cardinality
            //restrictions, that make sense only on the specified
                class. One contributes
            //those restrictions to the in-memory model here:
            contributeRestrictionsFromProperty(c, p);
            //It is also necessary to include the class as part of the
                properties domain:
            contributeToPropertyDomain(p, c);
            //It is also necessary to contribute to the properties
                range, given the property's type.
            //This may be a primitive type, or another class, in the
                case of a
    DatatypeProperty:
            t :=registerOrGetPropertyRange(p);
            contributeToPropertyRange(p, t);
        }else{
            //The property in this case was defined without respect to
                a single UML Class.
            //One can iteratate over its linked domains and ranges by
                following the UML
    Properties
            //that are annotated with special 'Domain' and 'Range'
                stereotypes.
            for (i :=0, i<linkedDomainTypes(c).length, i :=i+1){
                t :=linkedDomainTypes(c)[i];
                contributeToPropertyDomain(p, t);
            }
            for (i :=0, i<linkedRangeTypes(c).length, i :=i+1){
                t :=linkedRangeTypes(c)[i];
                contributeToPropertyRange(p, t);
            }
        }
    }
    /**
    Register a UML package.
    */
    void registerPackage(UMLPackage p){
        addToCollectionOfRegisteredPackages(internalForm
            (p));
    }
    /**
    Register a UML Instance.
    */void registerInstance(UMLInstance i)
        //Note that the instance is linked to its corresponding
            type in the internal model
        //during this method invocation:
        addToCollectionOfRegisteredInstances(internalForm
            (i));
    }
    /**
    Completes the intermediate model from the registered
        classes. At this point,
    most of the work has been performed accumulatively by
        the successive
    registration of UML elements through this registrar.
        Here one can return the
    intermediate form, doing some cleansing and validation
        of the ontology constructs
    in the process if one wishes.
    */
    IntermediateModel buildIntermediateModel( )
        cleanse(_intermediateModel);
```

```
        validate(_intermediateModel);
        return _intermediateModel;
    }
}
```

The Webify Solutions, Inc. Ontology Transformation Plugin (OTP) is an example of an embodiment of an AG tool 300. It represents a rather large ontology that is comprised of a hierarchy of sub-ontologies, divided into namespaces. The natural UML counterpart to namespaces is the Package element, which is used with the previously described tool to create the sub-ontologies. For each package and corresponding UML classes and properties, the tool generates a corresponding OWL file. Running the tool on the model as a whole yields a set of OWL files, one for each namespace, which fully describes the core ontology.

Figure 2:
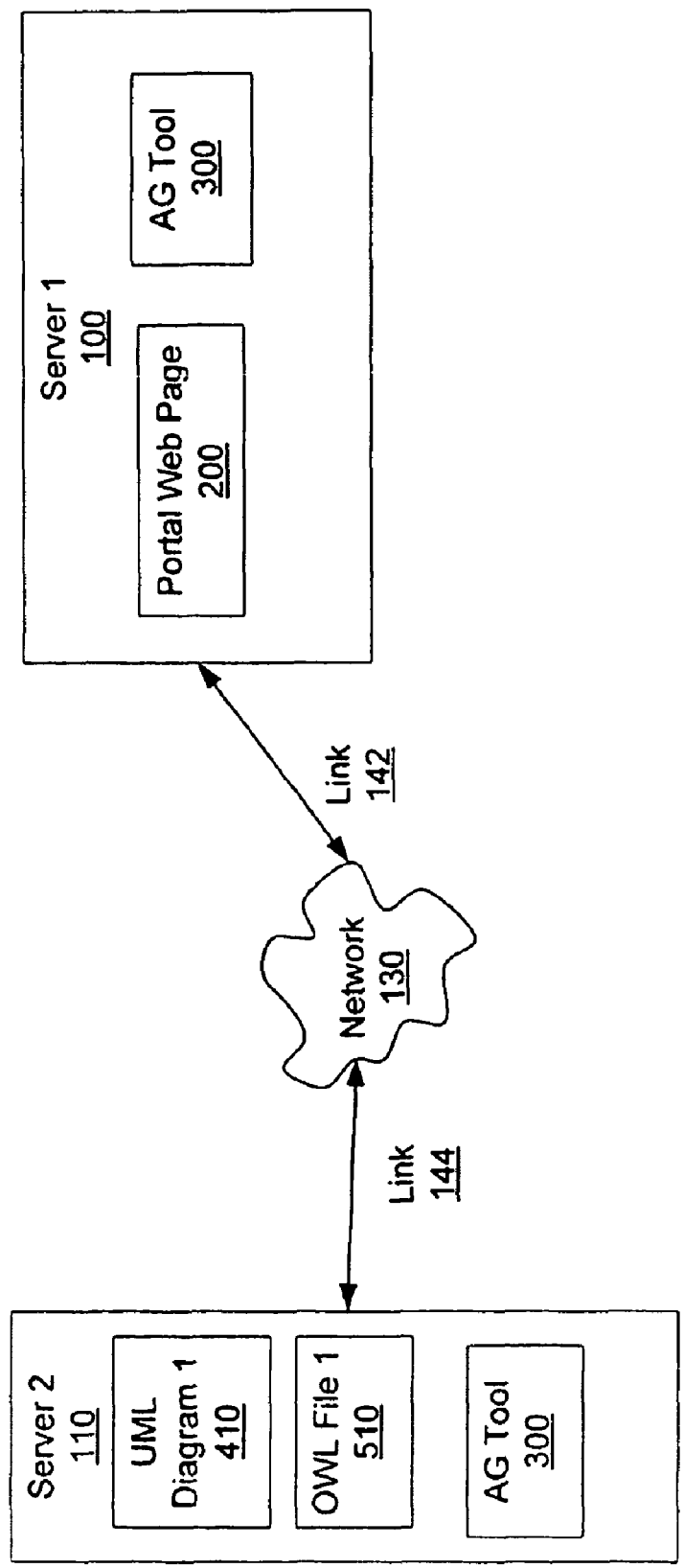
FIG. 2 is a block diagram showing an operating environment in which an AG tool can be created on one server and sent to another server for use there.

In another embodiment represented by Step 2200 in FIG. 6 and shown in FIG. 2, an AG tool 300 created on one server may sent to another server and used there.

Step 3000 in FIG. 5. Obtaining a class diagram 410 representing an ontology.

In an embodiment, one or more programmers create a UML class diagram 410 in RSA's modeling perspective, using the UML Profile that comes with the installed OTP, namely "Ontology Profile." The suite of stereotypes packaged with the profile is used to further annotate the classes and relationships in the model. In other embodiments, class diagrams can be expressed in forms other than UML, such as EMF (Eclipse Modeling Framework), XMI (XML Metadata Interchange), Booch Notation, Coad-Yourdon, OMT (Object Modeling Technique), Gane-Sarson, Fusion, Encore, and Shlaer-Mellor

UML

UML is a popular, well-used language for describing class hierarchies and properties to describe an ontology. For example, UML class diagrams are widely used for object-oriented analysis and design. They show the classes of a system, their interrelationships (including inheritance, aggregation, and association), and attributes of the classes. UML is widely used in organizations and not exclusively by software developers. It is often used to discuss use cases, requirements, and domains by all interested parties, which can include non-technical users of software systems. In short, it is a popular and easy-to-use language for describing a domain.

The only requirement of the person using this tool is a familiarity with UML. An understanding of more complex ontology facilities allows the developer to create correspondingly more powerful ontologies, but it is not required to create and reap the benefits of ontologies right away.

Example of a UML Ontology Using Classes

Figure 8:
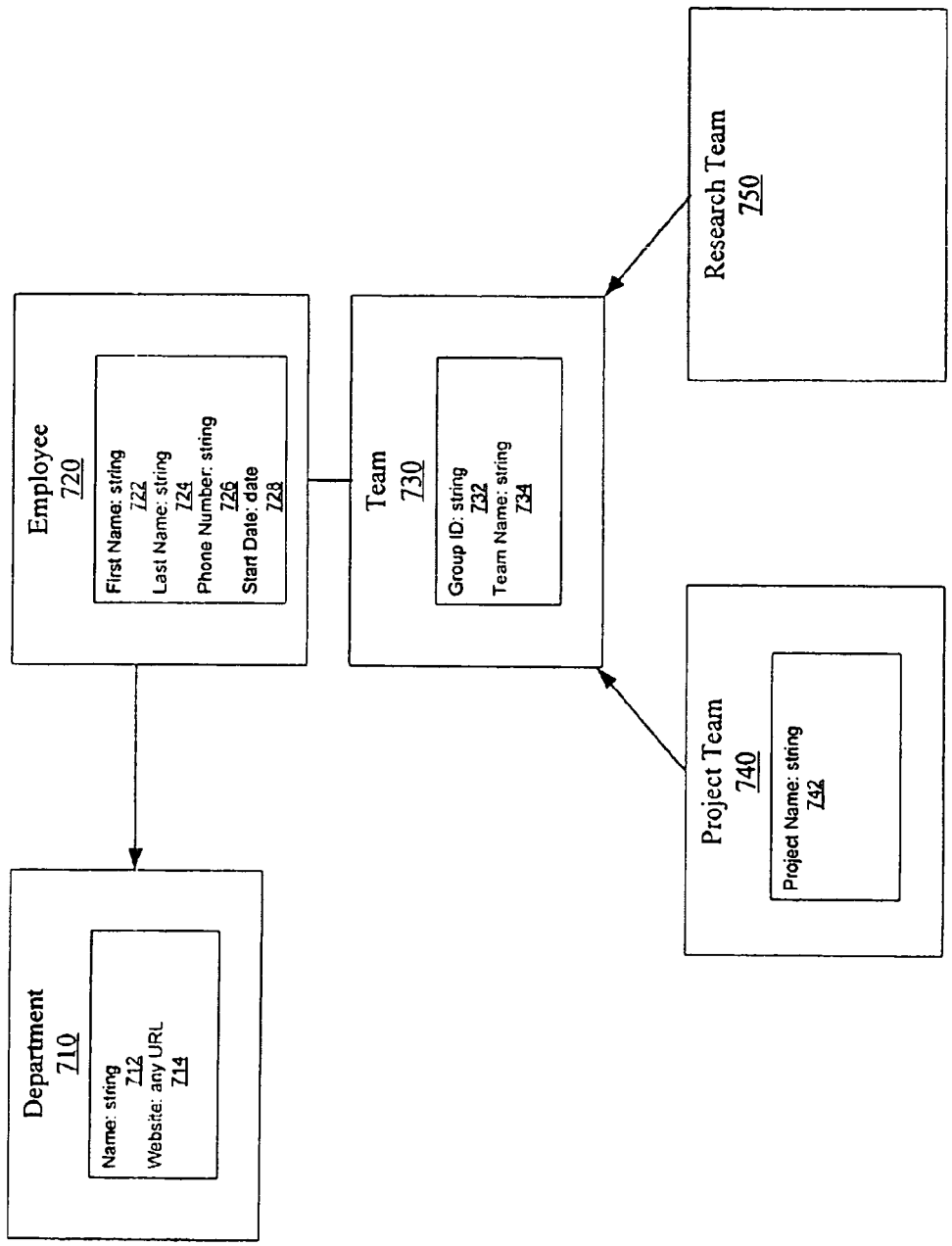
FIG. 8 is a block diagram showing common UML elements can be used to diagram the relationship between employees, groups, and departments in an ontology using classes.

Common UML elements can be used to diagram the relationship between employees, groups, and departments in the ontology mentioned above, as shown in FIG. 8. The elements of such an ontology could be as follows:

Department 710;
   This may be characterized by
      a string for a name 712, and
      a URL for a Website 714.
   Employee 720;
   This may be characterized by
      a string for a first name 722,
      a string for a last name 724,
      a string for a phone number 726, and
      a date 728 for a start date.
   Team 730;
   This may be characterized by
      a string for a group ID 732, and
      a string for a team name 734.
   Project Team 740;
   This may be characterized by
      a string for a project name 742.
   Research Team 750.

Example of a UML Ontology Using Classes Plus Stereotypes

Figure 9:
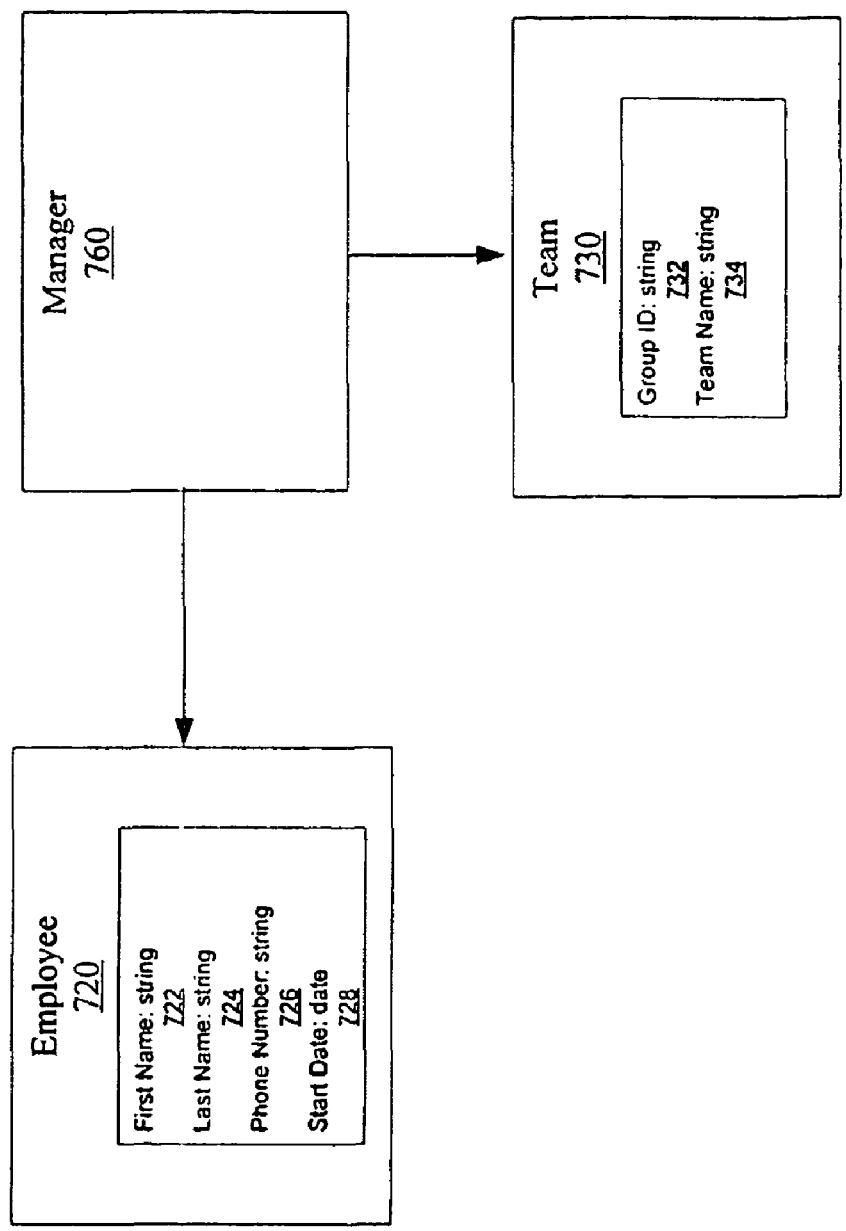
FIG. 9 is a block diagram showing common UML elements can be used to diagram the relationship between employees, groups, and departments in an ontology using classes plus stereotypes.

A property for an ontology can also be defined by using a UML class plus a UML stereotype. This approach is convenient, but also necessary to express certain ontology constructs without immediate UML counterparts, such as properties with heterogeneous domains and ranges (which aren't expressible in UML, but can exist in ontologies as they are defined as first class objects). For example, to define a property that can be used to characterize instances of both "Employee" and "Team"—a "manager" property, describing the manager of a Team or Employee—can be done in UML as shown in FIG. 9. The elements of such an ontology could be as follows:

Employee 720;
   This may be characterized by
      a string for a first name 722,
      a string for a last name 724,
      a string for a phone number 726, and
      a date 728 for a start date.
   Team 730;
   This may be characterized by
      a string for a group ID 732,
      a string for a team name 734.
   Manager 760.

UML can express most ontology constructs using UML stereotypes and stereotype attributes in conjunction with the breadth of UML diagram components.

Step 4000 in FIG. 5. Running the AG tool 300 on the UML class diagram 410.

The AG tool 300 can be run on the UML class diagram 410. In different embodiment, this can be done manually or automatically. The owl file generated in this case conforms to the OWL-DL dialect (specified at http://www.w3.org/TR/owl-guide/).

Example of an OWL Transformation

For example, the present invention can be used to develop and maintain the employee/team/department ontology mentioned above.

The tool generates XML namespace prefix attributes for the RDF tag,
   also specifying the default namespace which is on the UML package.
   <?xml version="1.0"?>
   <!-
   -->
   <rdf:RDF
      xmlns:rdf="http://www.w3.org/1999/02/22-rdf-syn-
         tax-ns#"
      xmlns:xsd="http://www.w3.org/2001/
         XMLSchema™"
      xmlns:rdfs="http://www.w3.org/2000/01/rdf-
         schema#"
      xmlns:owl="http://wwvv.w3.org/2002/07/owl™"
      xmlns:daml="http://www.daml.org/2001/03/daml+
         oil#"
      xmlns="http://www.testcompany.com/ontology/em-
         ployee™"
      xmlns:dc="http://purl.org/dc/elements/1.1/"
   xml:base="http://www.testcompany.com/ontology/em-
      ployee">
   <owl:Ontology rdf:about=" "/>
   <!--

The UML class 'Team' is transformed into a corresponding OWL Class. The multiplicity value for the 'teamName' property for this class in the UML are transformed into a cardinality restriction in the OWL.
-->
```
<owl:Class rdf:ID="Team">
   <rdfs:subClassOf>
      <owl:Restriction>
         <owl:on Property>
            <owl:FunctionalProperty rdf:ID="teamName"/>
         </owl:on Property>
         <owl:cardinality rdf:datatype="http://www.w3.org/2001/XMLSchema#int"
            >1</owl:cardinality>
      </owl:Restriction>
   </rdfs:subClassOf>
   <rdfs:subClassOf>
      <owl:Restriction>
         <owl:cardinality rdf:datatype="http://www.w3.org/2001/XMLSchema#int"
            >1</owl:cardinality>
         <owl:on Property>
            <owl:DatatypeProperty rdf:ID="groupId"/>
         </owl: on Property>
      </owl:Restriction>
   </rdfs:subClassOf>
   <rdfs:subClassOf>
      <owl:Restriction>
         <owl:cardinality rdf:datatype="http://www.w3.org/2001/XMLSchema#int"
            >1</owl:cardinality>
         <owl:on Property>
            <owl:FunctionalProperty rdf:ID="manager"/>
         </owl:on Property>
      </owl:Restriction>
   </rdfs:subClassOf>
</owl:Class>
```
>!-
The 'Department' class is transformed into OWL.
-->
```
<owl:Class rdf:ID="Department">
   <rdfs:subClassOf>
      <owl:Restriction>
         <owl:on Property>
            <owl:FunctionalProperty rdf:ID="name"/>
         </owl:on Property>
         <owl:cardinality rdf:datatype="http://www.w3.org/2001/XMLSchema#int"
            >1</owl:cardinality>
      </owl:Restriction>
   </rdfs:subClassOf>
</owl:Class>
```
<!-
The 'Employee' class, transformed into OWL.
-->
```
<owl:Class rdf:ID="Employee">
   <rdfs:subClassOf>
      <owl:Restriction>
         <owl:on Property>
            <owl:FunctionalProperty rdf:ID="lastName"/>
         </owl:on Property>
         <owl:cardinality rdfidatatype="http://www.w3.org/2001/XMLSchema#int"
            >1</owl:cardinality>
      </owl:Restriction>
   </rdfs:subClassOf>
   <rdfs:subClassOf>
      <owl:Restriction>
         <owl:cardinality rdf:datatype="http://www.w3.org/2001/XMLSchema#int"
            >1</owl:cardinality>
         <owl:on Property>
            <owl:FunctionalProperty rdf:ID="firstName"/>
         </owl:on Property>
      </owl:Restriction>
   </rdfs:subClassOf>
   <rdfs:subClassOf>
      <owl:Restriction>
         <owl:on Property>
            <owl:FunctionalProperty rdf:ID="department"/>
         </owl:on Property>
         <owl:cardinality rdf:datatype="http://www.w3.org/2001/XMLSchema#int"
            >1</owl:cardinality>
      </owl:Restriction>
   </rdfs:subClassOf>
   <rdfs:subClassOf>
      <owl:Restriction>
         <owl:on Property>
            <owl:FunctionalProperty rdf:ID="startDate"/>
         </owl:on Property>
         <owl:cardinality rdf:datatype="http://www.w3.org/2001/XMLSchema#int"
            >1</owl:cardinality>
      </owl:Restriction>
   </rdfs:subClassOf>
</owl:Class>
```
<!-
The 'ResearchTeam' class, transformed into OWL. Note that its subclass relationship to the 'Team' class, as captured in the UML, is also captured here using the 'subClassOf' tag.
-->
```
<owl:Class rdf:ID="ResearchTeam">
   <rdfs:subClassOf rdf:resource="#Team"/>
</owl:Class>
```
<!-
The 'ProjectTeam' class, transformed into OWL. Cardinality constraints and subclass relationships are captured in the transformation.
-->
```
<owl:Class rdf:ID="ProjectTeam">
   <rdfs:subClassOf>
      <owl:Restriction>
         <owl:on Property>
            <owl:FunctionalProperty rdf:ID="projectName"/>
         </owl:on Property>
         <owl:cardinality rdf:datatype="http://www.w3.org/2001/XMLSchema#int"
            >1</owl:cardinality>
      </owl:Restriction>
   </rdfs:subClassOf>
   <rdfs:subClassOf relfresource="#Team"/>
</owl:Class>
```
<!--
Following, the various properties expressed in the UML are transformed into UML ObjectProperty and DataProperty instances, depending on their range types.
-->
```
<owl:ObjectProperty rdf:ID="teamMember">
   <owl:inverseOf>
      <owl:ObjectProperty rdf:ID="memberOfTeam"/>
```

```
</owl:inverseOf>
  <rdfs:range rdfresource="#Employee"/>
  <rdfs:domain rdf:resource="#Team"/>
</owl:ObjectProperty>
<owl:ObjectProperty rdfabout="#memberOfTeam">
  <rdfs:range rdf:resource="#Team"/>
  <rdfs:domain rdf: resource="#Employee"/>
  <owl:inverseOf rdf:resource="#teamMember"/>
</owl:ObjectProperty>
<owl:DatatypeProperty rdf:ID="website">
  <rdfs:range rdf:resource="http://www.w3.org/2001/
    XMLSchema#anyURI"/>
  <rdfs:domain rdf:resource="#Department"/>
  <rdf:type rdf:resource="http://www.w3.org/2002/07/
    owl#FunctionalProperty"/>
</owl:DatatypeProperty>
<owl:DatatypeProperty rdf:about="#groupId">
  <rdfs:domain rdf:resource="#Team"/>
  <rdf:type rdf:resource="http://www.w3.org/2002/07/
    owl#FunctionalProperty"/>
  <rdfs:range rdf:resource="http://www.w3.org/2001/
    XMLSchema#string"/>
</owl:DatatypeProperty>
<owl:FunctionalProperty rdf: about="#department">
  <rdf:type rdf:resource="http://www.w3.org/2002/07/
    owl#ObjectProperty"/>
  <rdfs:range rdf:resource="#Department"/>
  <rdfs:domain rdf:resource="#Employee"/>
</owl:FunctionalProperty>
<owl:FunctionalProperty rdf:about="#firstName">
  <rdfs:domain rdfiresource="#Employee"/>
  <rdf:type rdf:resource="http://www.w3.org/2002/07/
    owl#DatatypeProperty"/>
  <rdfs:range rdfiresource="http://wwvv.w3.org/2001/
    XMLSchema#string"/>
</owl:FunctionalProperty>
<owl:FunctionalProperty rdf:about="#teamName">
  <rdf:type rdf:resource="http://www.w3.org/2002/07/
    owl#DatatypeProperty"/>
  <rdfs:domain rdfresource="#Team"/>
  <rdfs:range rdfresource="http://www.w3.org/2001/
    XMLSchema#string"/>
</owl:FunctionalProperty>
<owl:FunctionalProperty rdf:about="#lastName">
  <rdfs:domain rdf: resource="#Employee"/>
  <rdf:type rdfresource="http://www.w3.org/2002/07/
    owl#DatatypeProperty"/>
  <rdfs:range rdf:resource="http://www.w3.org/2001/
    XMLSchema#string"/>
</owl:FunctionalProperty>
  <owl:FunctionalProperty rdf: about="#startDate">
  <rdfs:range rdfresource="http://www.w3.org/2001/
    XMLSchema#date"/>
  <rdfs:domain rdfresource="#Employee"/>
  <rdf:type rdfresource="http://www.w3.org/2002/07/
    owl#DatatypeProperty"/>
</owl:FunctionalProperty>
<owl:FunctionalProperty rdfabout="#projectName">
  <rdfs:range rdfresource="http://www.w3.org/2001/
    XMLSchema#string"/>
  <rdf:type rdEresource="http://www.w3.org/2002/07/
    owl#DatatypeProperty"/>
  <rdfs:domain rdf: resource="#ProjectTeam"/>
</owl:FunctionalProperty>
<owl:FunctionalProperty rdf:ID="phNumber">
  <rdfs:range rdf:resource="http://www.w3.org/2001/
    XMLSchema#string"/>
  <rdftype r'dfresource="http://www.w3.org/2002/07/
    owl#DatatypeProperty"/>
  <rdfs:domain rdf:resource="#Employee"/>
</owl:FunctionalProperty>
<owl:FunctionalProperty rdf:about="#name">
  <rdfs:range rdf:resource="http://www.w3.org/2001/
    XMLSchema#string"/>
  <rdf:type rdf:resource="http://www.w3.org/2002/07/
    owl#DatatypeProperty"/>
  <rdfs:domain rdfresource="#Department"/>
</owl:FunctionalProperty>
<!-
The 'manager' property here was expressed in the UML as
a property-stereotyped UML class, so that its heterogenous
domain could be expressed. Here is this UML expression,
transformed into OWL.
-->
<owl:FunctionalProperty rdf: about="#manager">
  <rdfs:range rdf:resource="#Employee"/>
  <rdfs:domain rdf: resource="#Employee"/>
  <rdfs:domain rdf:resource="#Team"/>
  <rdf:type rdf:resource="http://www.w3.org/2002/07/
    owl#ObjectProperty"/>
</owl:FunctionalProperty>
</rdf: RDF>
```

Other Transformation Formats

The method of the present invention may also be used to transform ontology descriptions into other ontology description languages, such as any of the various OWL dialects, RDF, NTriple, and OIL+DAML. It can also independently generate other artifacts, such as Java interfaces, that correspond to the defined ontology classes and properties.

Advantage of Present Invention

The essential power of the present invention is that ontology authors no longer have to know the technical details of OWL or other ontology description languages in order to design and create ontologies and the corresponding machine-readable artifacts describing them. Instead, anyone who can design in UML can create an ontology that can then be transformed into OWL for use by enterprises and software. Because UML is widely used and familiar to many, if not most, software organizations, including organizations that purchase software, this method becomes much simpler than any of the other methods used to date.

By using UML to describe ontologies, the set of capable ontology authors can be expanded to include persons familiar with UML without having to train these persons in ontology-specific terminology and tools. This reduces training required to generate and, consequently, successfully use ontologies for their power and convenience.

Thus, this invention effectively and widely broadens the set of capable ontology authors, making it more efficient for organizations to reap the benefits of describing its domains using ontologies. Such benefits include 1. Saving time, money, and resources it would take to acquire ontology expertise;
2. Making adoption of ontology-based software, tools, and methodologies more appealing to customers, who are more likely familiar with UML than with ontology concepts;
3. Providing auto-generation of ontology artifacts, making the artifacts less prone to defects by human error; and
4. Making ontology development and editing a speedier process.

Computer System Overview

Figure 10:
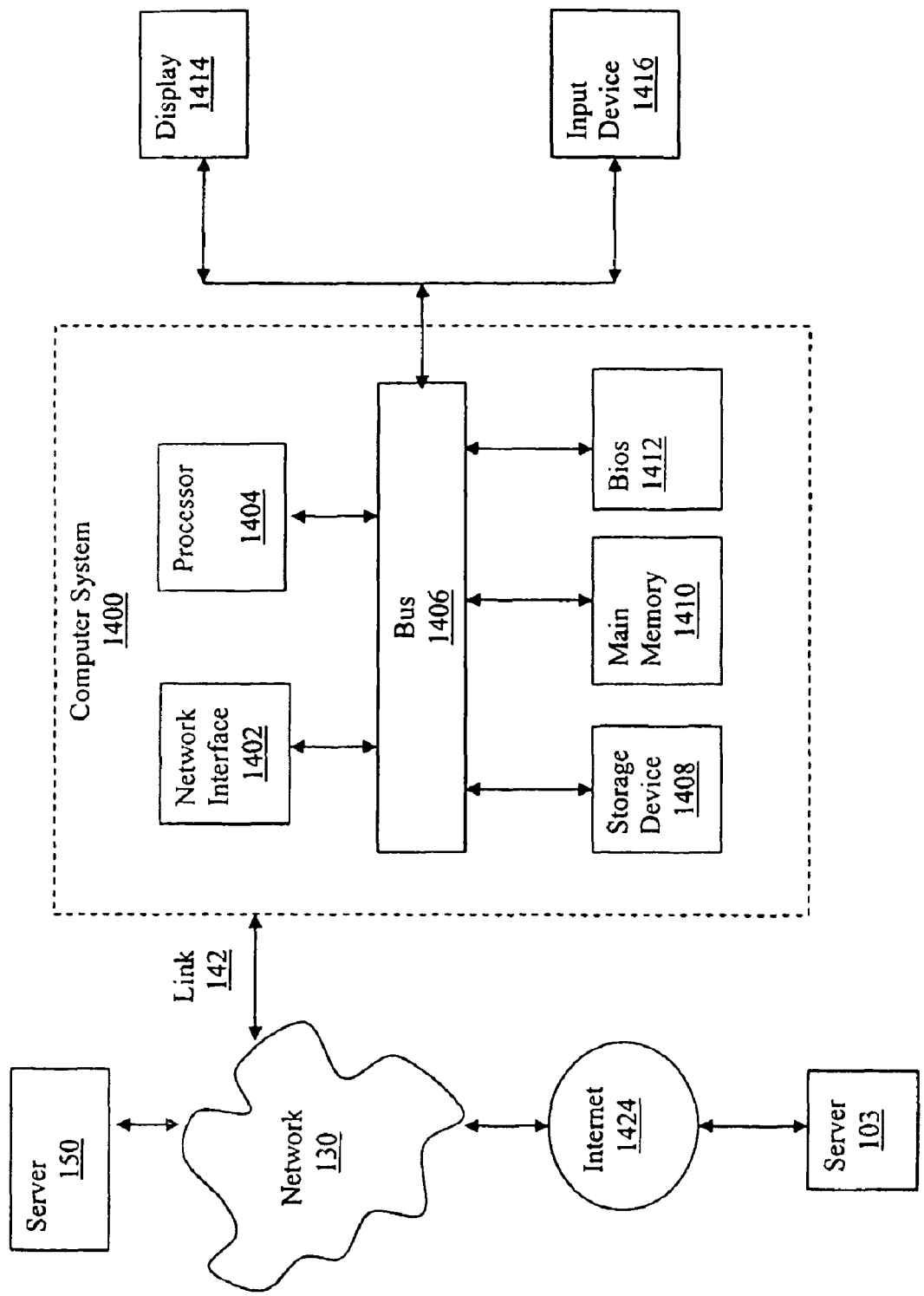
FIG. 10 is a block diagram that illustrates a typical computer system, representing a provider server on which embodiments of the present invention can be implemented.

FIG. 10 is a block diagram that illustrates a typical computer system 1400, well known to those skilled in the art, representing a server 100 on which embodiments of the present invention can be implemented. This computer system 1400 comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:
- a processor 1404 for processing information;
- a storage device 1408, such as an optical disc, a magneto-optical disc, or a magnet disc, for storing information and instructions;
- main memory 1410, which is a dynamic storage device such as a random access memory (RAM) that stores information and instructions to be carried out by processor 1404;
- a bios 1412 or another form of static memory such as read only memory (ROM), for storing static information and instructions to be carried out by processor 1404;
- a display 1414, such as a liquid crystal display (LDC) or cathode ray tube (CRT) for displaying information to user of the computer system 1400; and
- an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data comprising client application messages from computer 150 and server 103 used by client business, through a network 130 such as the Internet, and appropriate links 142, such as wired or wireless ones, and its network interface 1402. It can of course transmit data back to client business application over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile, non-volatile, and transmission media. Volatile media comprise dynamic memory, such as main memory 1410. Non-volatile media comprise magnetic, magneto-optical, and optical discs, such as storage device 1408. Transmission media comprise a wide range of wired and unwired transmission technology, comprising cables, wires, modems, fiber optics, acoustic waves, such as radio waves, for example, and light waves, such as infrared, for example. Typical examples of widely used computer-readable media are floppy discs, hard discs, magnetic tape, CD-ROMs, punch cards, RAM, EPROMs, FLASH-EPOMs, memory cards, chips, and cartridges, modem transmissions over telephone lines, and infrared waves. Multiple computer-readable media may be used, known and not yet known, can be used, individually and in combinations, in different embodiments of the present invention.

Alternate Embodiments

The previous extended description has explained some of the alternate embodiments of the present invention. It will be apparent to those skilled in the art that many other alternate embodiments of the present invention are possible without departing from its broader spirit and scope.

It will also be apparent to those skilled in the art that different embodiments of the present invention may employ a wide range of possible hardware and software techniques. For example, the communication between devices could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among client applications and Web services.

Furthermore, in the previous description the order of processes, their numbered sequences, and their labels are presented for clarity of illustration and not as limitations on the present invention.

What is claimed is:

1. A method for generating a machine-readable representation of ontologies, the method comprising
   obtaining a Unified Modeling Language class diagram for representing the ontologies;
   providing an autogeneration utility; and
   using the autogeneration utility to transform the Unified Modeling Language class diagram directly into a standard representation of the ontologies.

2. The method of claim 1 wherein
   the representation of the ontology is a Web Ontology Language file.

3. The method of claim 2 wherein providing an autogeneration utility further comprises
   implementing the model transformation capabilities of IBM Rational Software Architect™; and
   using the open source Jena framework to implement writing to the Web Ontology Language file.

4. The method of claim 3 wherein implementing the model transformation capabilities of IBM Rational Software Architect™ further comprises
   executing a visitor-like pattern for iterating over all of the Unified Modeling Language elements in the Unified Modeling Language diagram.

5. The method of claim 4 wherein implementing the model transformation capabilities of IBM Rational Software Architect™ further comprises
   configuring a plurality of rule classes; and
   executing one of the plurality of rule classes when a different type of Unified Modeling Language element is encountered.

6. The method of claim 2 wherein using the autogeneration utility to transform the Unified Modeling Language class diagram directly into a standard representation the ontologies further comprises
   visiting each Unified Modeling Language element once;
   determining the Unified Modeling Language element type;
   determining a rule to be fired for the element type; and
   firing the rule for each element type.

7. The method of claim 6 further comprising
   delegating the rule to a registrar class; and
   executing a method for building the ontology model from the registered Unified Modeling Language elements.

8. The method of claim 6 further comprising
   configuring rules for just those Unified Modeling Language types that are relevant to transform the Unified Modeling Language class diagram into a standard representation of the ontologies.

9. The method of claim 8 wherein the Unified Modeling Language types are selected from the group consisting of classes, primitives, properties, packages and instances.

10. The method of claim 2 wherein
    the Unified Modeling Language class diagram is created on a first server, and transformed on the first server into an Web Ontology Language file by means of an autogeneration tool; and
    the autogeneration tool is sent to a second server.

11. The method of claim 1 further comprising an autogeneration tool, wherein the autogeneration tool is created on a first server, and the autogeneration tool is sent to a second server.

12. A method for transforming a Unified Modeling Language class diagram into an ontology description language file, the method comprising
    a non-volatile data storage area for storing electronic files;
    obtaining an autogeneration tool;
    obtaining a Unified Modeling Language class diagram representing an ontology; and
    running the autogeneration tool directly on the Unified Modeling Language class diagram.

13. The method of claim 12 wherein obtaining an autogeneration tool further comprises
    creating the autogeneration tool.

14. The method of claim 12 further comprising
    creating the autogeneration tool on a first server; and
    running the autogeneration tool on a second server.

15. The method of claim 14 wherein the ontology description language is selected from the group consisting of Web Ontology Language, Resource Description Framework, NTriple, and Ontology Interchange Language+Defense Advanced Research Projects Agency Agent Markup Language.

16. The method of claim 14 further comprising generating at least one artifact that corresponds to the ontology class and properties.

17. The method of claim 16 wherein the artifact further comprises a JAVA interface.

18. The method of claim 12 wherein obtaining a Unified Modeling Language class diagram representing an ontology further comprises
    defining a property for the ontology by using a Unified Modeling Language class and a Unified Modeling Language stereotype.

19. The method of claim 12 further comprising transforming a description for the ontology into an ontology description language.

20. A system for generating a machine-readable representation of ontologies, the system comprising
    a first server for obtaining a Unified Modeling Language class diagram for representing the ontologies and for using an autogeneration utility to directly transform the Unified Modeling Language class diagram into a standard representation of the ontologies, the server comprising
       a processor for processing information,
       a storage device,
       a main memory,
       a display, and
       an input device;
    a communications network;
    a network interface; and
    one or more host computers.

* * * * *